Feb. 28, 1950 R. B. HANER 2,498,809
SIGNAL GENERATOR
Filed Oct. 9, 1946
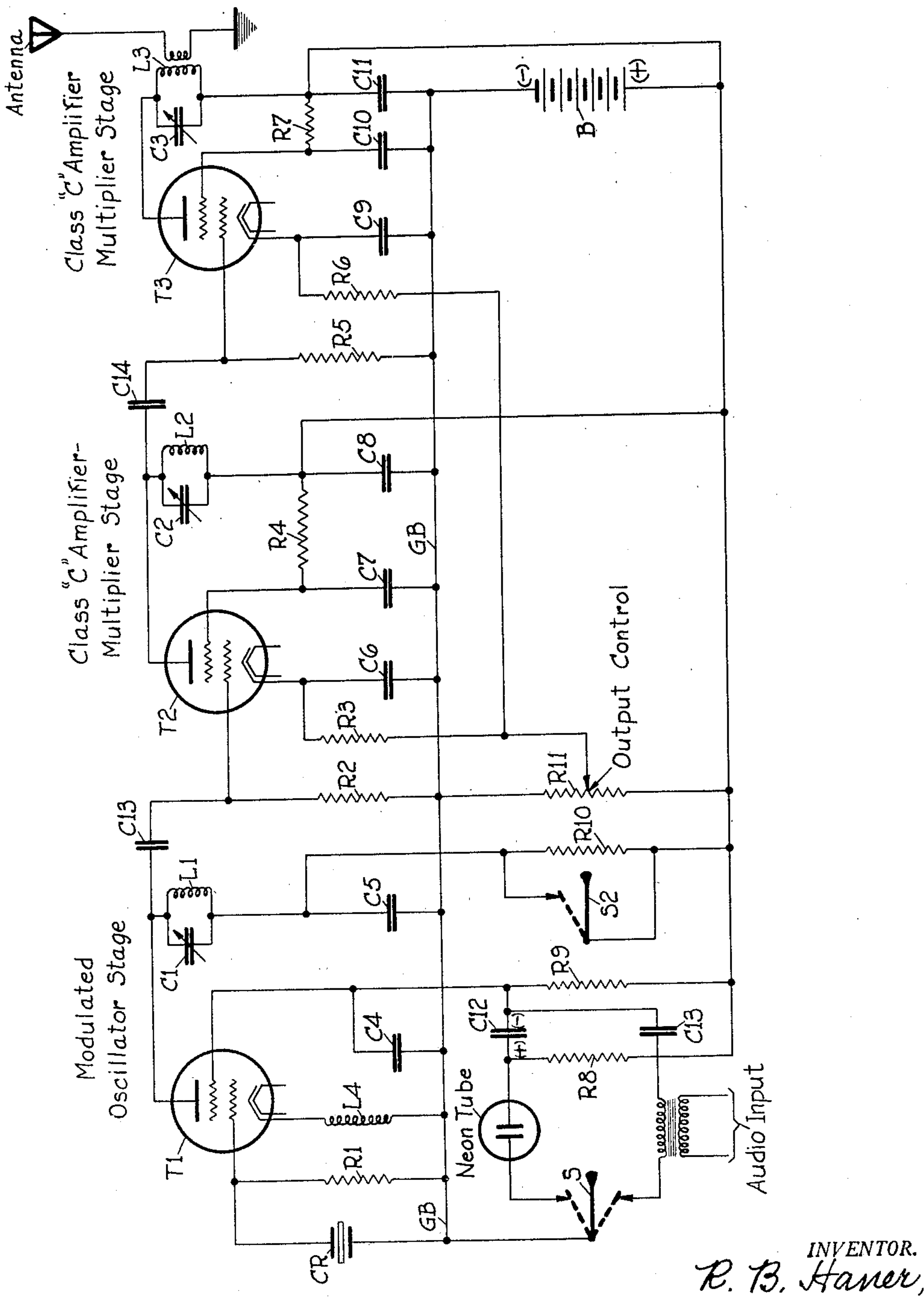
INVENTOR.
R. B. Haner,
BY
Neil W. Preston,
his ATTORNEY Patented Feb. 28, 1950

2,498,809

UNITED STATES PATENT OFFICE 2,498,809

SIGNAL GENERATOR

Robert B. Haner, Scottsville, N. Y., assignor to General Railway Signal Company, Rochester, N. Y.

Application October 9, 1946, Serial No. 702,150

2 Claims. (Cl. 250—36)

This invention relates to radio communication systems, and more particularly pertains to a weak signal generator of the frequency modulated type for use in connection with the alignment of radio receiving apparatus.

In aligning radio receivers, it is desirable to have an associated frequency generator which will produce a relatively weak signal for test purposes, since the adjustment of a radio receiver to a relatively strong signal will not be proper for weak signal reception. On the other hand, a radio receiver adjusted for weak signals will always be capable of receiving stronger signals. For this reason, it is desirable to provide a weak signal generator which may have its output adjustable from somewhat below one microvolt to one thousand microvolts or more. It is also desirable to provide such frequency generator or transmitter with a very accurate base frequency especially if the radio receiver adjustment is to be a permanent one for reception from a particular station or a group of stations operating on a fixed frequency.

In accordance with the above desiderata, it is proposed to provide a harmonic generating crystal oscillator which will deliver an output on the selected harmonic of the crystal frequency, which output may be modulated in accordance with an audio frequency input by applying the audio frequency potentials to the screen grid of a tetrode tube employed for the oscillator. This modulated output of the oscillator stage includes both amplitude modulation and frequency modulation, but it is proposed to amplify the frequency modulated portion of the output and remove the amplitude variations by employing amplifiers of the class "C" type for the multiplier stages. Since these class "C" radio amplifiers are so operated as to use the entire output and remove the amplitude variations by employing amplifiers of the class "C" type for the multiplier stages, it will be apparent that these stages not only act to amplify the frequency modulation present in the output of the oscillator but also act to subsantiallty remove or eliminate any amplitude modulation which may be present. With these general characteristics and purposes of the present invention in mind, it is believed expedient to consider further features in connection with the discussion of the structural characteristics of one embodiment of the present invention.

The single figure of the drawings illustrates one embodiment of a weak signal frequency modulated transmitter constructed in accordance with the present invention.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, then with the idea of illustrating the specific construction and arrangement of parts that would be employed in practice.

With reference to the drawing, three electronic tubes T1, T2 and T3 of the screen grid tetrode type are shown as constituting the different stages of the transmitter embodying the present invention. The tube T1 and its associated devices and circuits constitute the modulated oscillator stage; the tube T2 with its associated devices and circuits constitute a class "C" type amplifier and multiplier stage; and the tube T3 with its associated devices and circuits also constitutes a class "C" type amplifier and multiplier stage with its output connected to suitable antenna and ground connections. These tubes T1, T2 and T3 have been indicated as being of the cathode heater type, it being assumed that the cathode heaters are controlled in any suitable way to continuously maintain the cathodes of these tubes at the proper temperature while the system is in operation.

The oscillator stage includes a crystal CR of the piezoelectric type. This crystal CR and cathode inductance L4 are adapted to oscillate at the base or fundamental frequency of the crystal while the tank circuit C1—L1 is tuned to resonate at the desired harmonic of the base frequency.

The control grid, cathode and screen grid of the tube T1 are connected to provide a grounded anode triode type oscillator under control of the crystal CR. The screen grid acts in effect as the grounded anode with radio frequencies being by-passed around the battery B and resistor R9 to the ground bus GB by the condenser C4. The control grid and cathode operate above ground potential with respect to radio frequencies by virtue of the crystal CR and the cathode inductance L4. The plate of the tube T1 (the regular anode of the tetrode) receives an electron flow from the cathode which is controlled by the control and screen grids at the frequency of the crystal oscillator CR. This action through the grid control of the tube acts to supply the plate tank circuit with energy for its oscillations at the harmonic frequency. The plate tank circuit C1—L1 is connected through radio frequency by-pass condenser C5 to the ground bus GB, while suitable positive energy from the plate supply B is provided through the resistor R10. The resistor R1 acts to furnish the control grid bias for tube T1.

The output of the plate circuit of the oscillator tube T1 is governed by the control of the screen grid which is connected to the cathode connection through the radio frequency bypass condenser C4 and is supplied with potential from the plate source B through resistor R9. A suitable neon tube with condenser C12 and resistor R8 is connected across the resistor R9 so that when the switch S is closed in its upper position, this neon tube acts as a relaxation oscillator to produce a suitable audio frequency of about one thousand cycles, for example, for modulating the output of the tube T1 by varying the potential drop across the resistor R9. This variation of the potential applied to the screen grid of tube T1 acts to produce modulations in the output of tube T1 both of the amplitude type and of the frequency type.

The output of the tube T1 thus modulated is supplied through a coupling condenser C13 to the control grid of the tube T2. This control grid is connected to the ground bus GB through resistance R2 which serves as a direct current return for the grid of tube T2. The tank circuit C2—L2 of this stage is tuned to a suitable harmonic of the input so that this stage will act as a multiplier, and this tank circuit is supplied with positive energy from the plate supply B in the usual way with the condenser C8 acting to bypass the battery B with respect to radio frequencies. The screen grid of tube T2 is supplied with potential through resistor R4 with a suitable radio frequency bypass condenser C7 connected to the ground bus GB.

In a similar manner tube T3 is supplied with the output from the tube T2 through a condenser C14. The control grid of this tube T3 is connected to the ground bus GB through the resistor R5 to provide a direct current return. The tank circuit C3—L3 for the tube T3 is also tuned to a suitable harmonic of the input to this stage source to multiply the frequency. This tank circuit C3—L3 is supplied with positive potential from the plate source B in the usual way with a radio frequency bypass condenser C11.

The screen grid of this stage is supplied with potential from source B through resistor R7 with a radio frequency bypass condenser C10. The inductance L3 has a secondary winding which acts as the output coupler for a suitable antenna-ground connection.

The cathodes of tubes T2 and T3 are respectively connected to the ground bus GB through radio frequency bypass condensers C6 and C9. The bias for the grids of these tubes are respectively provided by resistors R3 and R6 being connected through a variable resistor R11 of the potentiometer type connected across the source B. This potentiometer adjustment controls the output of the amplifier-multipler stages over a fairly wide range, but in order to provide greater range of adjustment for the unit as a whole, it will be noted that the output of the oscillator stage may be increased by the closure of switch S2 to shunt the resistor R10 to thereby increase the potential applied to the plate circuit of the tube T1. In this way, the output of the organization is continuously variable over two different stepped ranges.

The amplifier-multiplier stages are operated according to the principles of class "C" type amplifiers with the plate output being high on the characteristic curve of each such a tube. In other words, increase in the signal amplitude or strength to these stages fails to cause a corresponding increase in their output. In this way, the amplitude modulations or variations in the output of the tube T1 are effectively eliminated where as the frequency modulation for variations in the output of tube T1 are substantially and effectively amplified to produce a frequency modulated output for the signal generator as a whole. Since this signal generator is controlled by a crystal operating at its fundamental frequency, it will be readily apparent that the center frequency of the frequency modulated output will be very stable. It is, of course, understood that suitable thermostatic temperature control may be provided for the organization to further maintain the stability of its frequency adjustment.

For test purposes it is convenient to have a stable steady tone of an identifiable pitch, and for this reason a suitable relaxation neon tube type oscillator is provided, but it is to be understood that the operation of the switch S to its lower position will provide for modulating the output of the oscillator stage by any other suitable audio input, such as by voice. A conventional coupling for such an audio input has merely been indicated for convenience in the illustration.

In the illustration, a tetrode type electron tube is employed with audio frequency potentials being applied to its screen grid to modulate the output circuit of the tube. This is the preferred form of the present invention, since it gives an optimum amount of frequency modulation for any given amount of audio potential. However, it should be understood that the audio potentials may be applied to the control grid of the tube T1 to provide what is known as grid modulation and thereby obtain similar, although less effective, operation of the organization as above described. Also, a triode tube may be employed in place of the tetrode tube T1 in which case the modulating audio potentials may be applied to either its control grid or its plate circuit. This latter form, however, is less desirable than the preferred form since it is more subject to undesired variations due to changes in load conditions.

Having described a radio signal generator of the frequency modulated type as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice without in any manner departing from the spirit or scope of the present invention.

What I claim is:

1. A signal generator of the character described comprising, a piezoelectric crystal oscillator for generating radio frequency current of stabilized frequency, said oscillator including a thermionic tube having a screen grid, means including a resistor for applying a positive potential to said screen grid, a relaxation oscillator comprising a gas tube and a condenser, charging and discharging circuits for said condenser, said discharging circuit including said resistor and said gas tube whereby the output of said piezoelectric crystal oscillator is frequency and amplitude modulated by said relaxation oscillator, a plurality of frequency multiplier stages for successively multiplying the output of said piezoelectric crystal oscillator, each of said stages including a thermionic tube having its grid bias governed by a fixed resistor providing the proper bias necessary to cause that stage to operate near the saturation point of that tube, and means including a single potentiometer connected in series with the respective fixed bias resistors for adjustably adding to the negative bias of said frequency multiplier stages above the bias provided by the fixed resistors, whereby the output power of the signal generator is variable within the limits of said potentiometer and whereby the amplitude modulation is substantially eliminated by the frequency multiplier stages, even when said potentiometer is at its minimum negative bias position.

2. In a signal generator for generating a frequency modulated carrier current, a piezoelectric crystal oscillator for generating radio frequency current of stabilized frequency, said oscillator including a thermionic tube having an anode and a screen grid, circuit means including a first resistor for applying positive potential to said screen grid and a second resistor for applying positive potential to said anode, a relaxation oscillator comprising a gas tube and a condenser, respective charging and discharging circuits for said condenser, said discharging circuit including said first resistor and said gas tube, whereby the intermittent firing of said gas tube modulates said piezoelectric crystal oscillator, a plurality of frequency multiplier stages for successively multiplying the modulated frequency current output of said piexoelectric crystal oscillator, each of said stages including a thermionic tube having its grid bias governed by a fixed resistor providing the proper bias necessary to cause that stage to operate near the saturation point of that tube and thereby reduce amplitude modulation of the carrier current to a minimum, means including a single potentiometer connected in series with the fixed bias resistors of the respective stages for adjustably adding to the negative bias of said frequency multiplier stages above the bias provided by said fixed resistors to thereby govern the power output of the signal generator, and a manually operable switch effective when actuated to increase the potential applied to the anode of the thermionic tube of said piezoelectric crystal oscillator by shunting said second resistor, and thereby in combination with said potentiometer provide a second variable range of power output for said signal generator.

ROBERT B. HANER.

REFERENCES CITED

The following references are of record in the file of this patent:

UNITED STATES PATENTS

| Number | Name | Date |
|---|---|---|
| 1,884,945 | Willoughby | Oct. 25, 1932 |
| 1,917,102 | Dome | July 4, 1933 |
| 1,966,065 | Gunn | July 10, 1934 |
| 2,054,431 | Lindenblad | Sept. 15, 1936 |
| 2,280,707 | Kell | Apr. 21, 1942 |